(12) United States Patent
Huang et al.

(10) Patent No.: US 8,281,680 B2
(45) Date of Patent: Oct. 9, 2012

(54) POWER-AUGMENTING TRANSMISSION STRUCTURE FOR AN ELECTRIC CAR

(75) Inventors: Hui-Hui Huang, Tainan Hsien (TW); Alex Lin, Tainan Hsien (TW); Jeff Wang, Tainan Hsien (TW); Weily Chen, Tainan Hsien (TW)

(73) Assignee: Aeon Motor Co., Ltd., Tainan Hsien (TW)

( * ) Notice: Subject to any disclaimer, the term of this patent is extended or adjusted under 35 U.S.C. 154(b) by 790 days.

(21) Appl. No.: 12/457,304

(22) Filed: Jun. 8, 2009

(65) Prior Publication Data

US 2010/0311541 A1 Dec. 9, 2010

(51) Int. Cl.
*F16H 59/00* (2006.01)
*H02P 17/00* (2006.01)

(52) U.S. Cl. .......................................... 74/337; 477/15

(58) Field of Classification Search ............ 74/330, 74/331, 329, 340, 337.5, 425, 337, 640; 475/5; 477/15

See application file for complete search history.

(56) References Cited

U.S. PATENT DOCUMENTS

| | | | | |
|---|---|---|---|---|
| 6,202,499 | B1* | 3/2001 | Brinn | 74/329 |
| 7,428,852 | B2* | 9/2008 | Baldwin et al. | 74/337.5 |
| 8,001,862 | B2* | 8/2011 | Albulushi et al. | 74/329 |
| 8,020,803 | B2* | 9/2011 | Waide et al. | 244/7 R |
| 8,082,816 | B2* | 12/2011 | Lai et al. | 74/337.5 |
| 2007/0209460 | A1* | 9/2007 | Baldwin et al. | 74/335 |
| 2009/0019967 | A1* | 1/2009 | Himmelmann | 74/665 L |
| 2010/0043596 | A1* | 2/2010 | Takeshima | 74/665 B |
| 2010/0179024 | A1* | 7/2010 | Holmes | 477/5 |

\* cited by examiner

*Primary Examiner* — Troy Chambers
*Assistant Examiner* — Jude Agendia
(74) *Attorney, Agent, or Firm* — Bacon & Thomas, PLLC

(57) ABSTRACT

A power-augmenting gear structure for an electric car includes a low-speed and power-augmenting transmitting route additionally installed in a gear case, with an output shaft of an electric motor extending in the gear case. The gear case has transmission gears forming conventional normal speed transmitting routes with normal speed reducing ratio for running on common flat roads, and a low-speed and power-augmenting transmitting route to be used in case of moving up an upward slope or coping with a condition needing a large torque. Then the electric motor may be reduced in its size, weight and cost, without necessity of enlarging it to have a large power.

2 Claims, 15 Drawing Sheets

US 8,281,680 B2

POWER-AUGMENTING TRANSMISSION STRUCTURE FOR AN ELECTRIC CAR

BACKGROUND OF THE INVENTION

1. Field of the Invention

This invention relates to a low-speed and power-augmenting transmission structure for an electric car, particularly to one provided in a gear case for augmenting the power of an electric car so as to move up an upward slope easily without increasing the power of the electric motor of an electric car.

2. Description of the Prior Arts

Nowadays numerous industries in our society depend upon fossil oil, and especially transportation requires tremendously large quantity of gasoline and diesel refined from fossil oil. As consumption of fossil oil has gone up and up, the price of fossil oil has risen up to a surprising level, so related sectors have been struggling to find substitutes all over the world. Therefore electricity has become one of its substitutes, used in electric cars or hybrids, in order to reduce heavy dependence on fossil oil. A conventional electric car shown in FIG. 1 is mainly provided with a driving axle 80, which drives a last gear 70, and the last gear 70 then drives a rear wheel axle 81 to move the car forward or backward. However, a conventional electric car needs a very great power in case it runs up an upward slope, and manufacturers have to make the car and the electric motor larger to conquer this problem, and accordingly have to add up its cost and enlarge its body, in addition to the drawback that the rear wheel axle 81 becomes heavier to result in bad effect in its suspension.

SUMMARY OF THE INVENTION

This invention has an object to offer a low-speed power-augmenting transmission structure for an electric car, without changing the power of the electric motor so that the electric car can move up an upward slope easily or cope with a condition requiring a large torque.

The characteristic of the invention is a low-speed and power-augmenting transmission structure added to conventional general transmission gears provided in a gear case, so that an electric car may move up easily an upward slope or cope with a condition needing a large torque, belittling the largest power of an electric motor and accordingly reducing the size, weight and cost of the electric motor and its controller.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
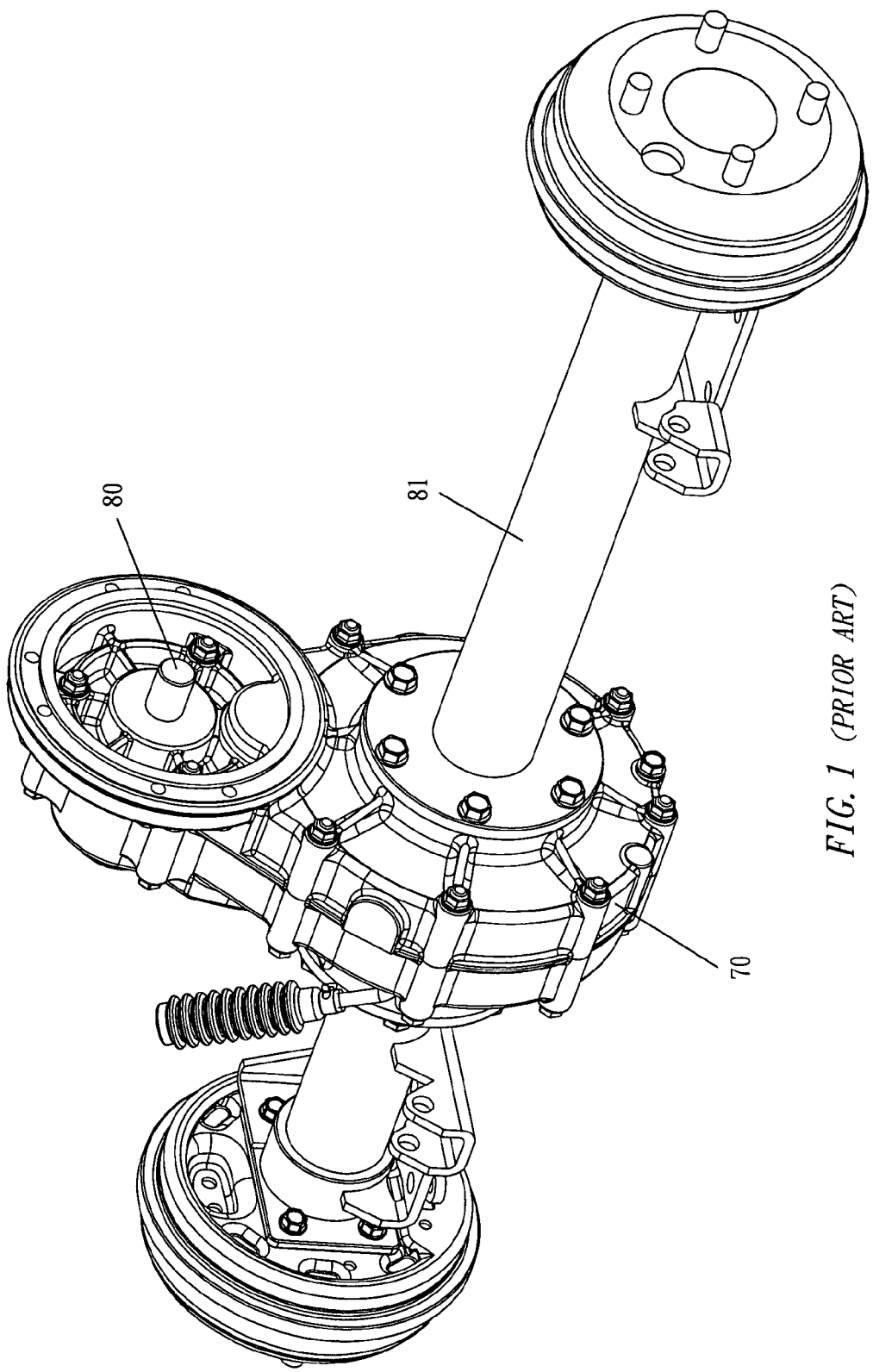
FIG. 1 is a perspective view of the driving device of a conventional electric car.
Figure 2:
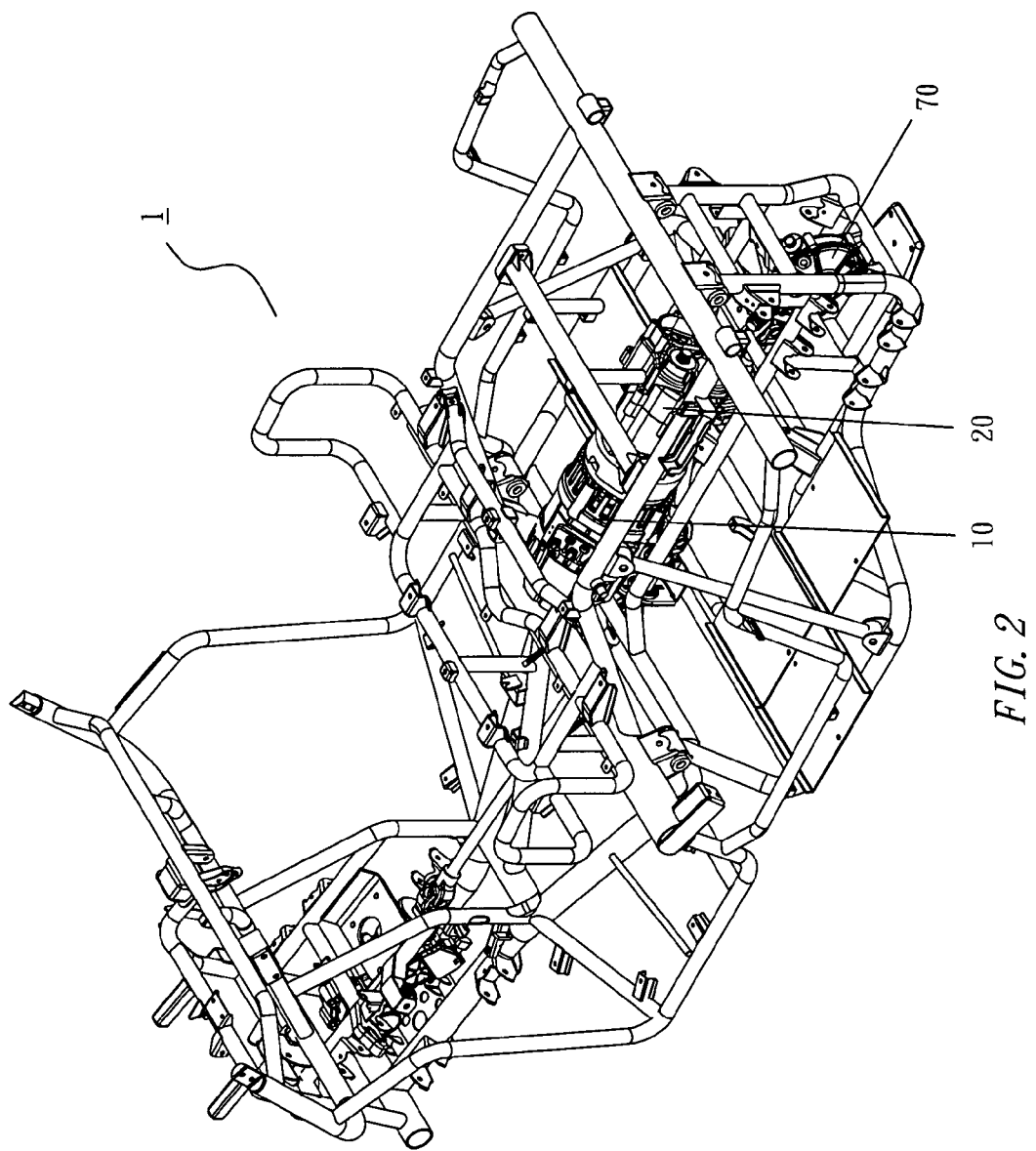
FIG. 2 is a perspective view of a low-speed power-augmenting transmission structure for an electric car placed in the frame of an electric car in the present invention.
Figure 3:
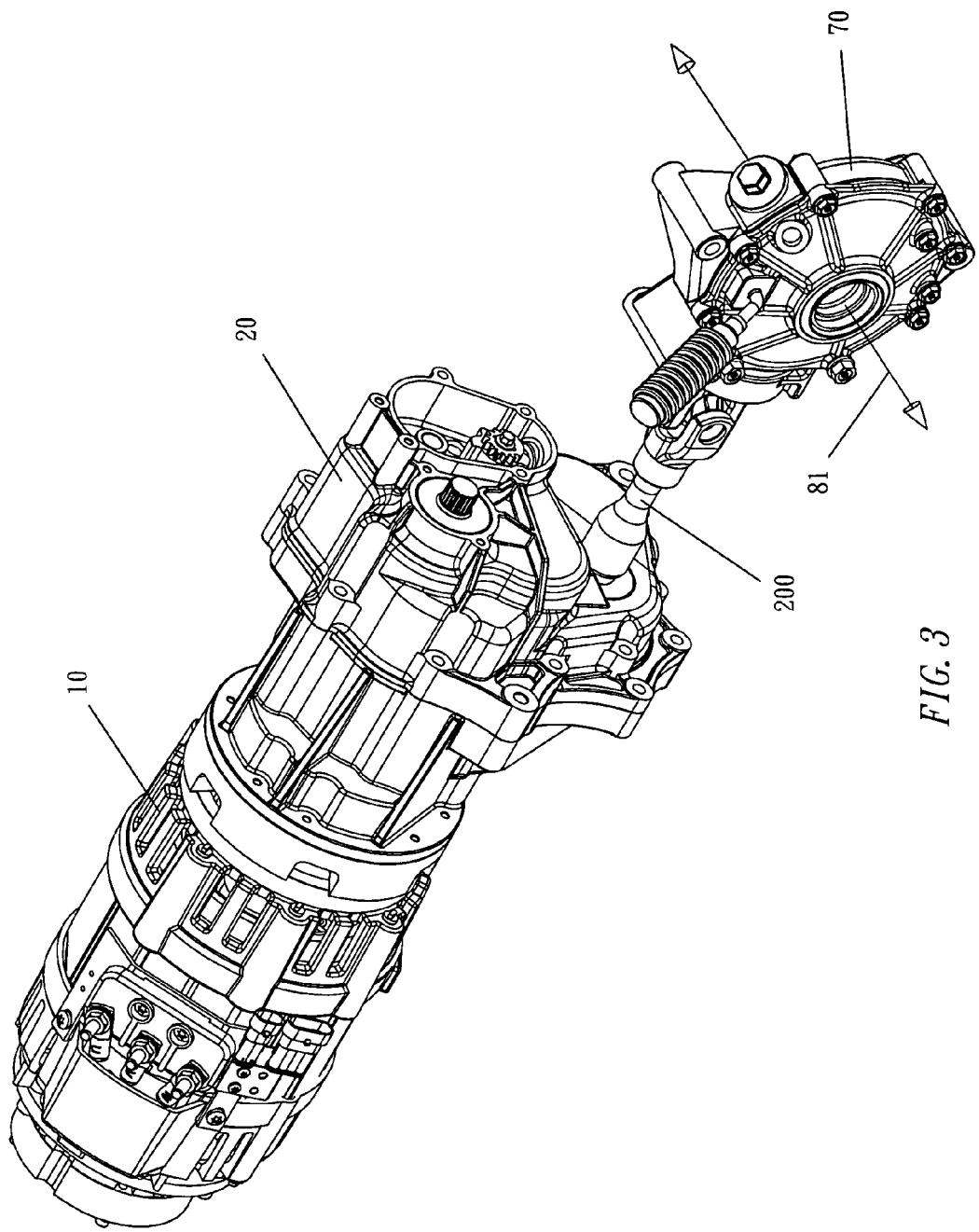
FIG. 3 is a perspective view of the power transmission system of an electric motor in the present invention.

A preferred embodiment of a power-augmenting transmission structure for an electric car in the present invention, as shown in FIGS. 2-5, includes an electric motor 10, an output shaft 100 of the motor 10, several transmission gears installed in a gear case 20, and an output shaft 200 of the gear case 20 for rotate a last gear 70, which drives a wheel axle (a rear wheel axle or a front wheel axle).

The gear case 20 has a general common speed transmission route 20a with a normal speed reducing ratio for running on common flat roads, and a low-speed and power-augmenting transmission route 20b with a large speed-reducing ratio for moving up easily an upward slope or coping with a condition demanding a large torque.

Figure 6:
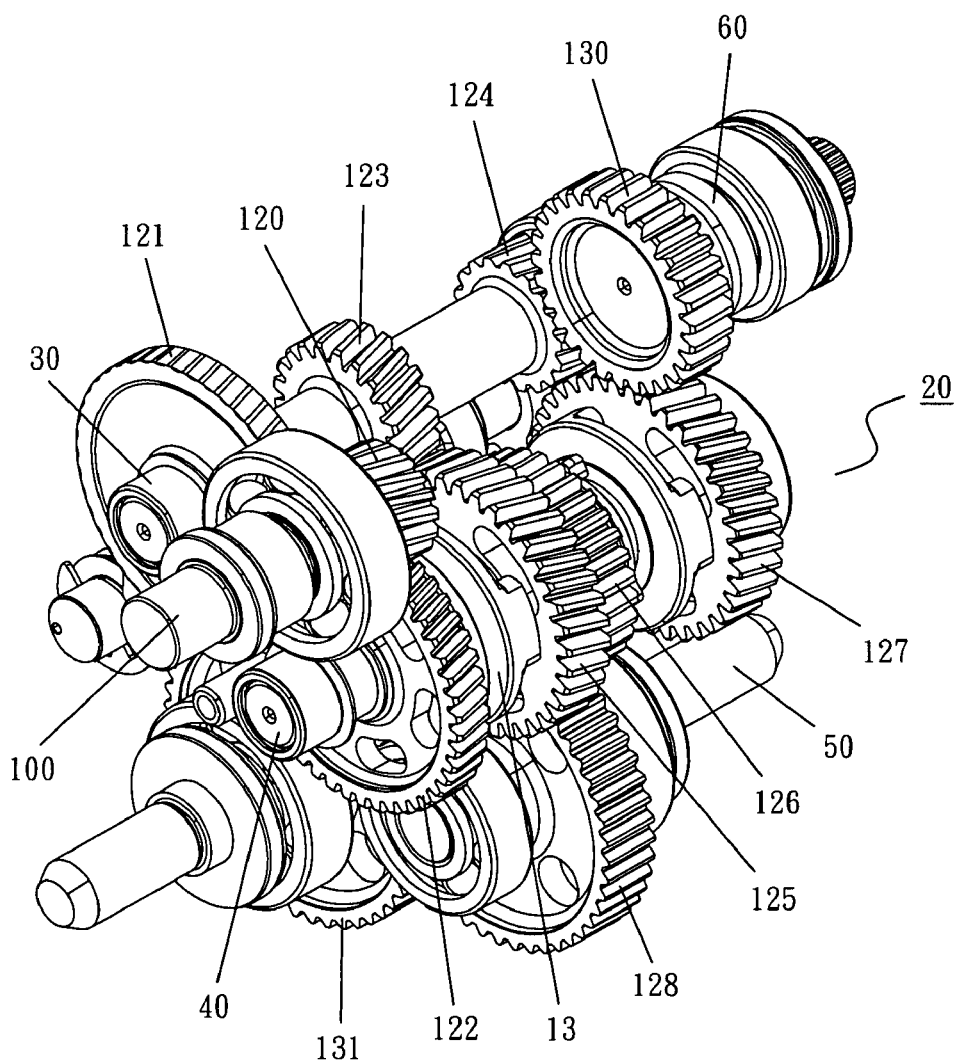
FIG. 6 is a magnified perspective view of the interior of the gear case in the present invention.
Figure 7:
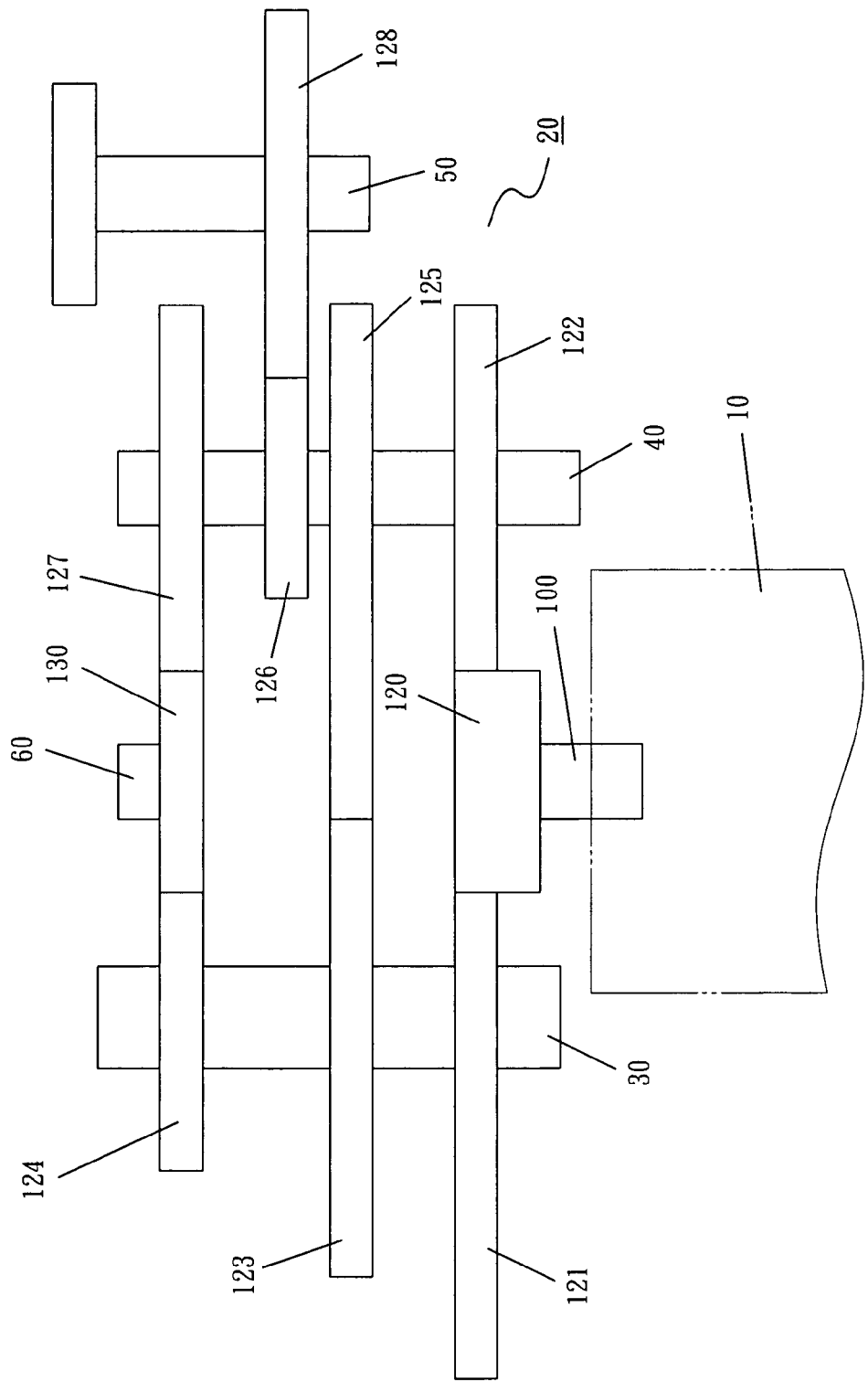
FIG. 7 is a block diagram of the arrangement of the transmission gears in the present invention.
Figure 8:
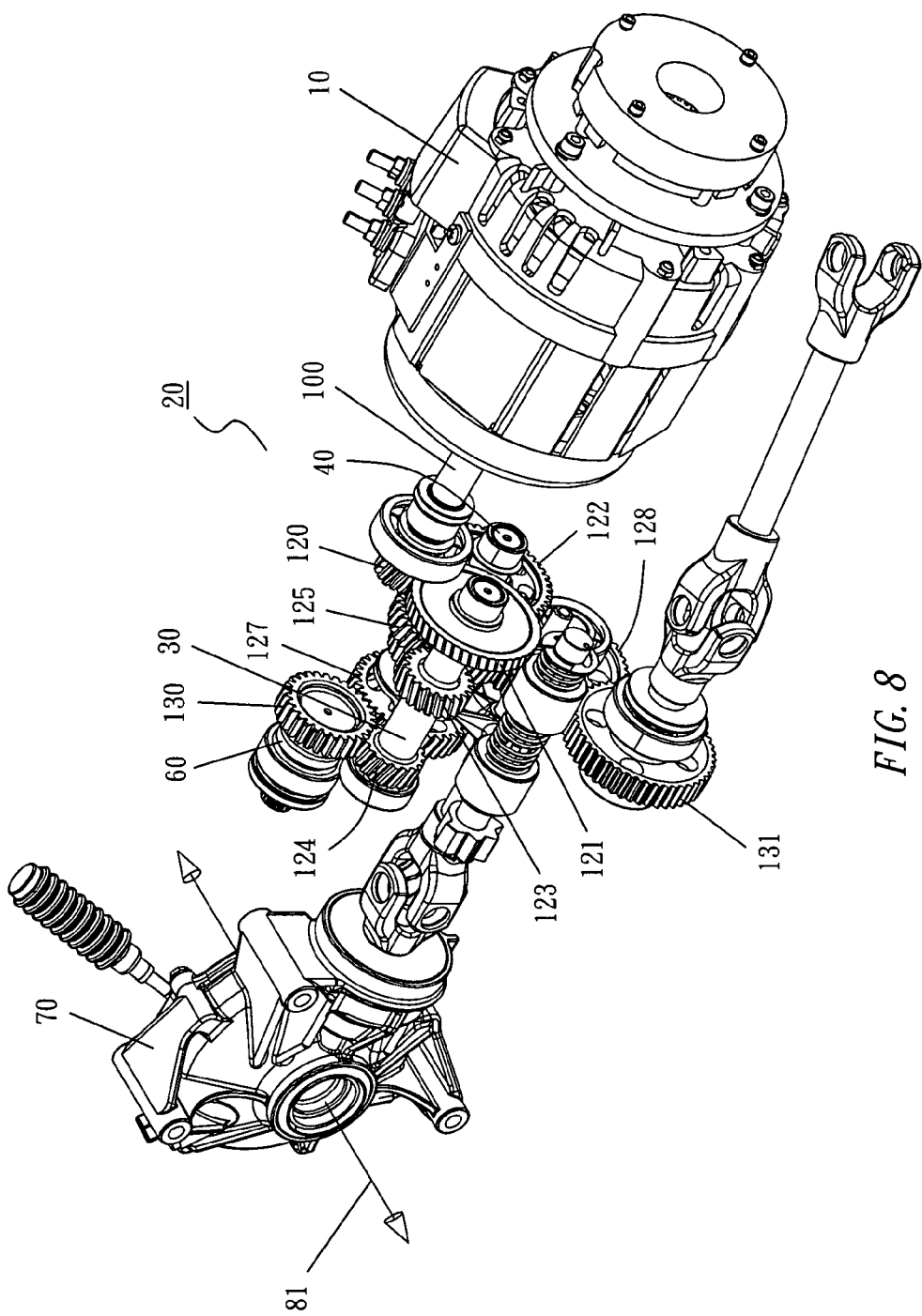
FIG. 8 is another perspective view of FIG. 5 from another direction.
Figure 9:
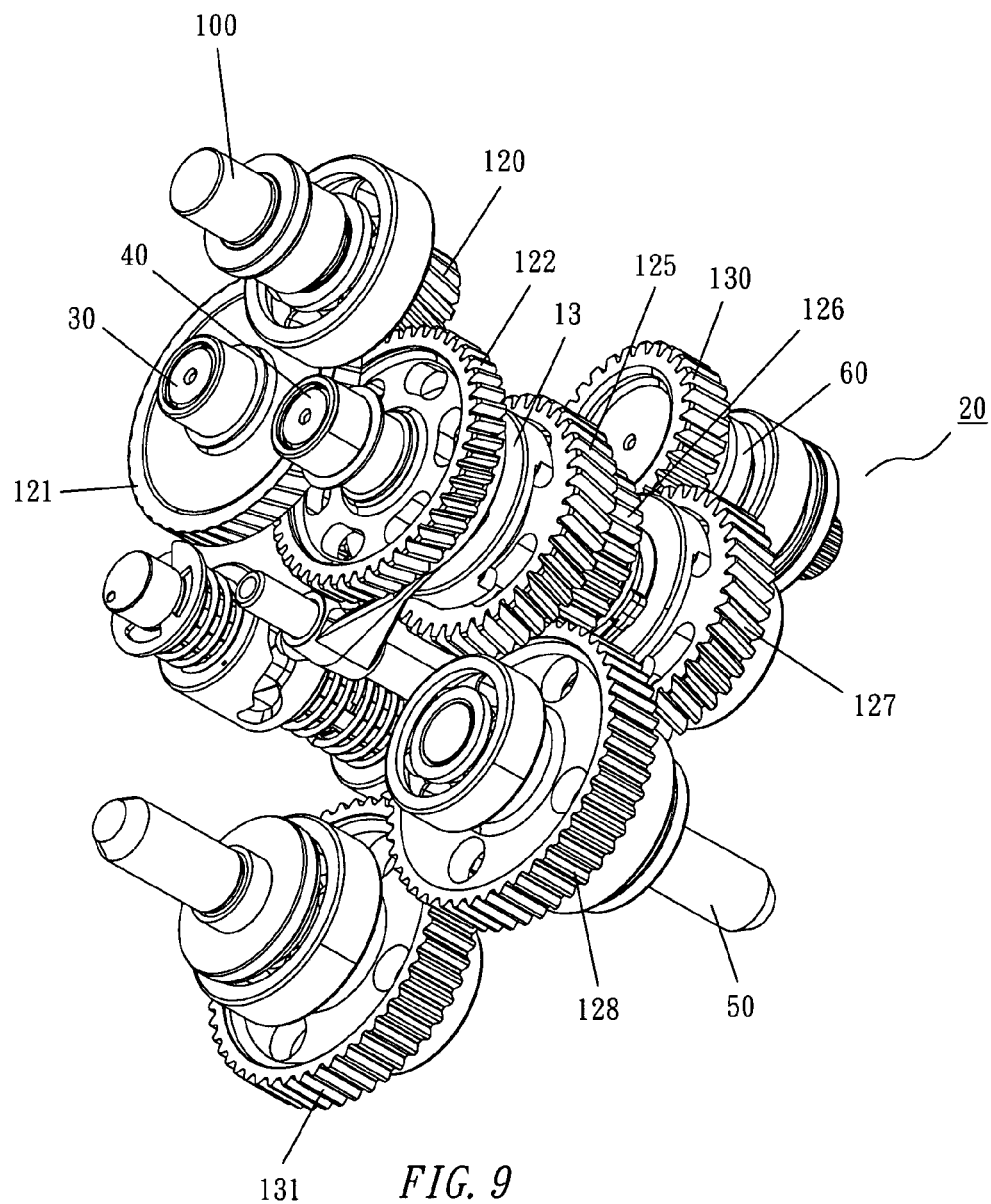
FIG. 9 is a perspective view of FIG. 6 from a second direction.
Figure 10:
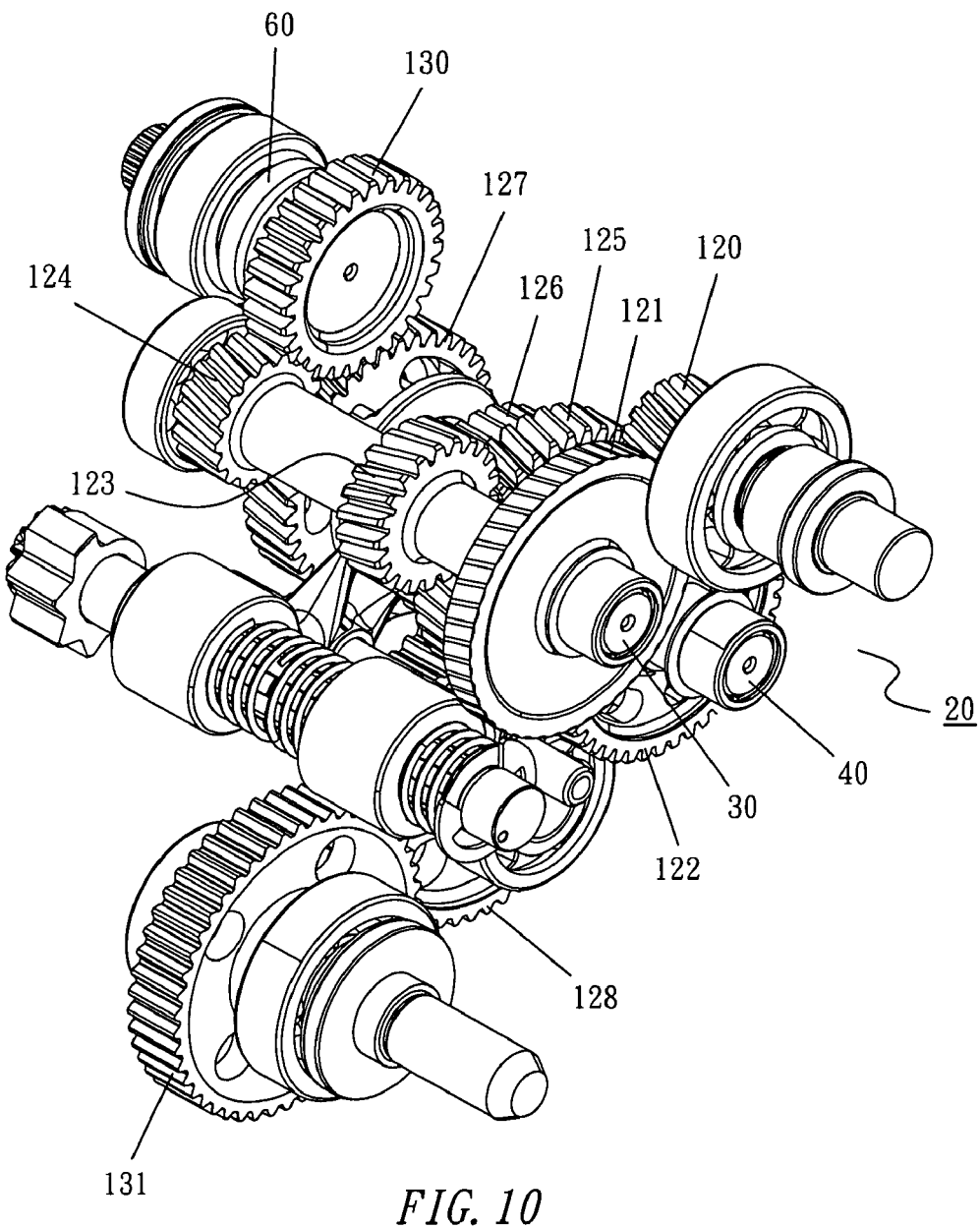
FIG. 10 is a perspective view of FIG. 6 from a third direction.
Figure 11:
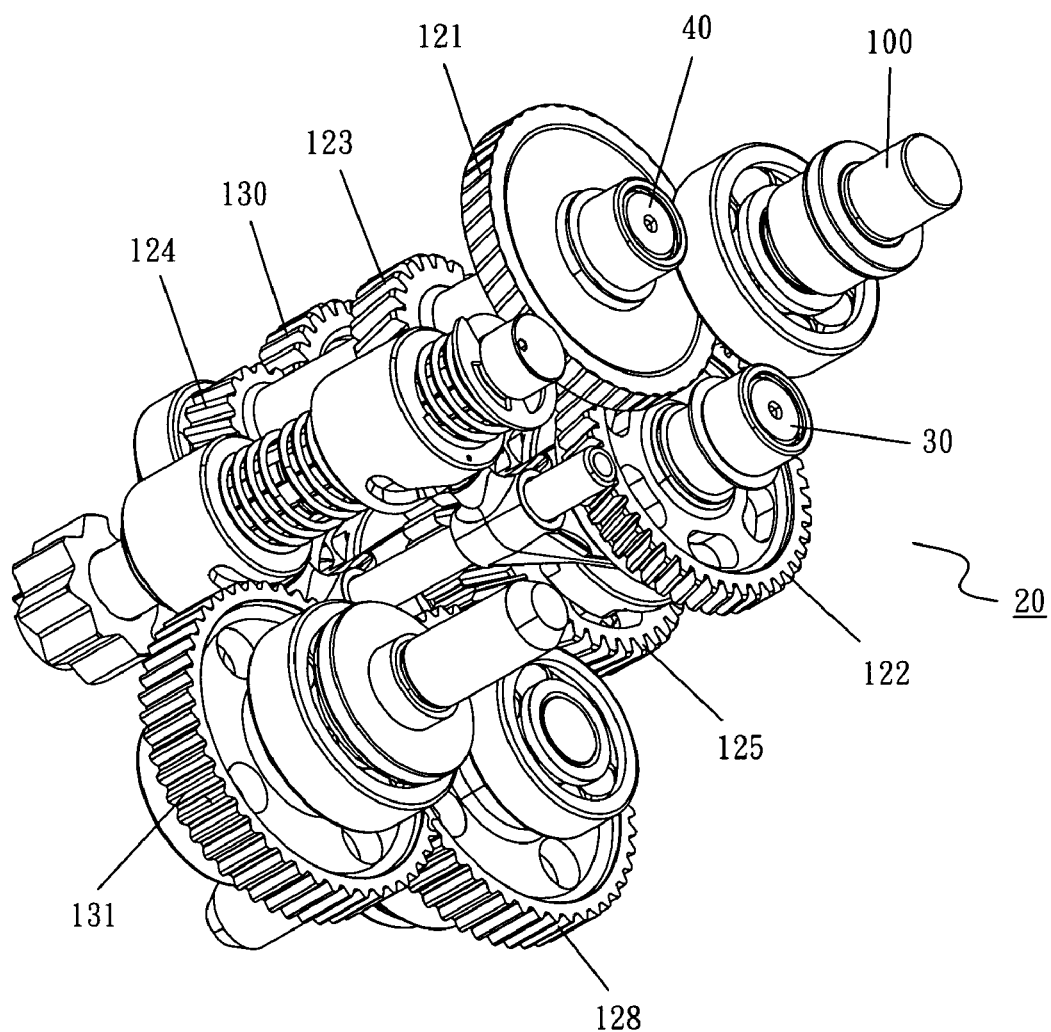
FIG. 11 is a perspective view of FIG. 6 from a fourth direction.

The gear transmission system, referring to FIGS. 5-11, includes an output shaft 100 of the motor 10, a first transmission gear 120 fixed on an end of the output shaft 100, a second transmission gear 121 fixed on a first rotatable shaft 30, a third transmission gear 122 fixed on a second rotatable shaft 40, with the first gear 120 able to engage with the second gear 121 or the third gear 122 optionally by means of a clutch. The second and the third gear 121 and 122 have the same number of teeth. The gear transmission system further includes a fourth transmission gear 123 and a fifth transmission gear 124 fixed orderly on the first rotatable shaft 30 with the first gear 121 fixed thereon and having less teeth than the first gear 121. The fourth and the fifth gear 123 and 24 may rotate synchronously with the first gear 121, as shown in FIGS. 7 and 8.

Furthermore, the gear transmission system has a second rotatable shaft 40, which is provided with a clutch 13, and a sixth transmission gear 125, a seventh transmission gear 126 and an eighth transmission gear 127 fixed orderly on the second rotatable shaft 40 that the third gear 122 is fixed on. Then the fourth gear 123 engages with or disengages from the sixth gear 125 by means of the clutch 13 as shown in FIGS. 6 and 7. The gear transmission system further includes a third rotatable shaft 50 in parallel to the first and the second rotatable shaft 30 and 40, with a ninth transmission gear 128 engaging with the seventh gear 126 fixed thereon, and a fourth rotatable shaft 60 fixed with a guide gear 130 installed between the fifth gear 124 and the eighth gear 127 and engaging with the both gears 124 and 127 at the same time. Thus, the fifth gear 124 may reverse the rotating direction of the eighth gear 127.

Figure 4:
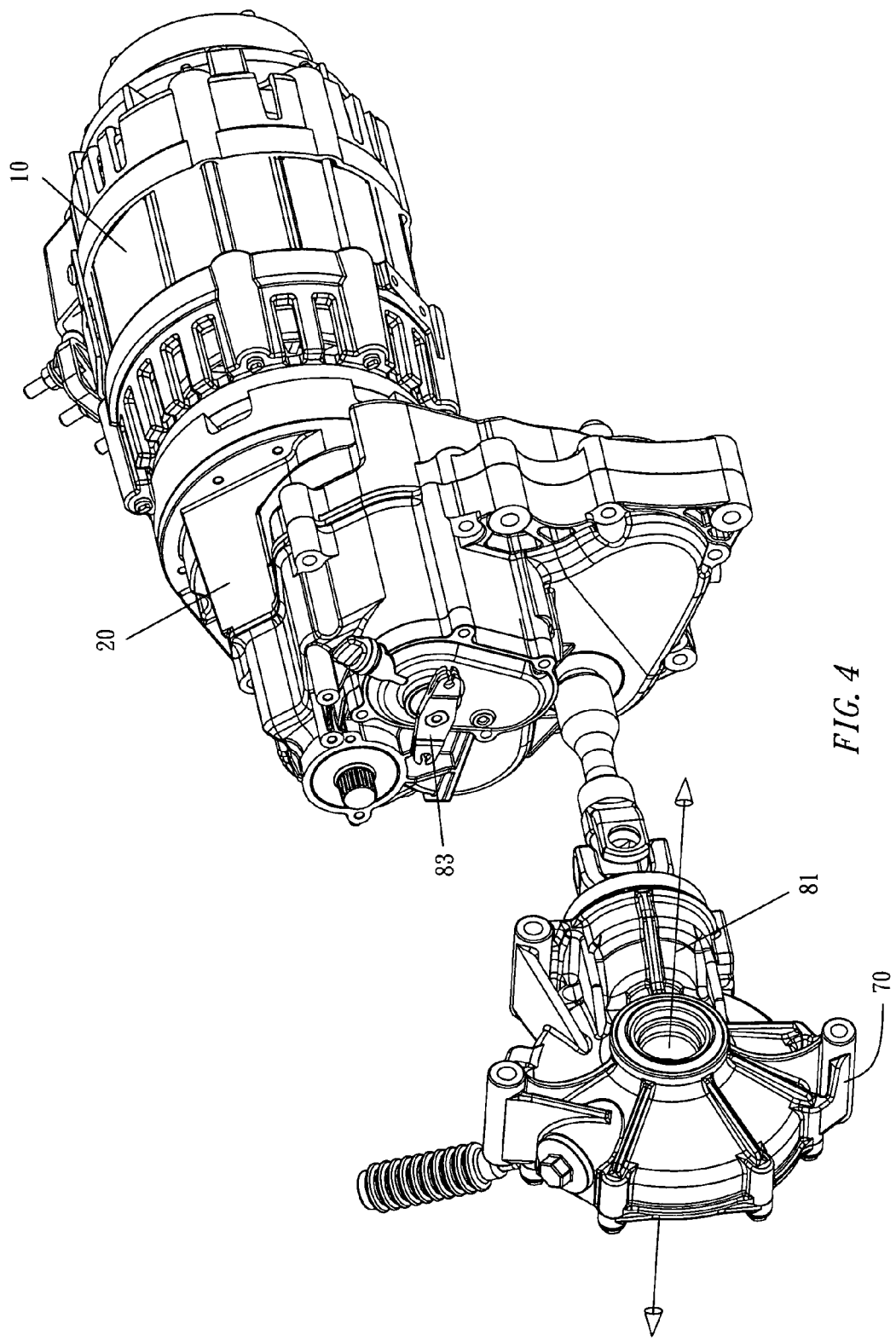
FIG. 4 is another perspective view of the power transmission system of an electric motor in the present invention.
Figure 5:
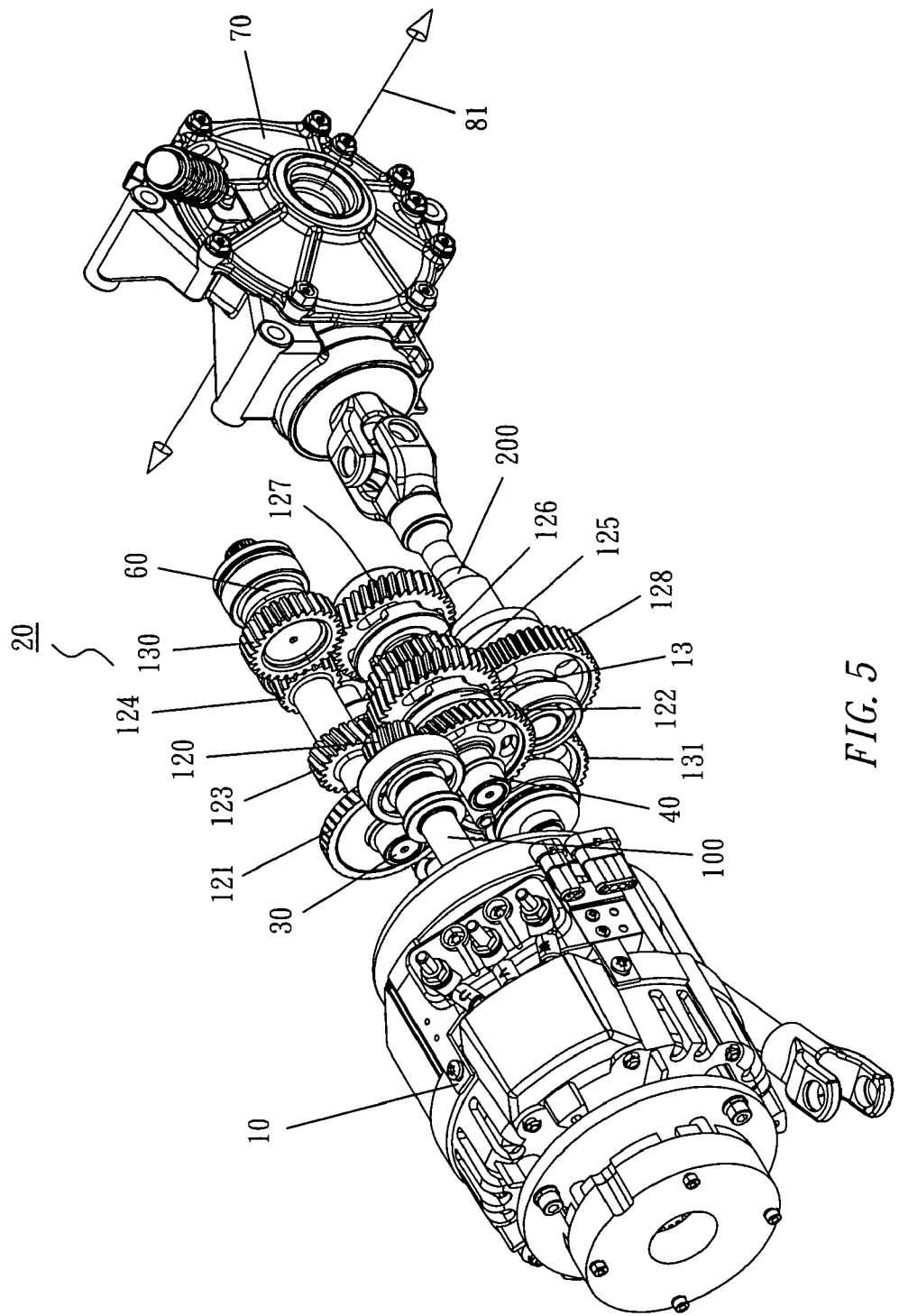
FIG. 5 is a perspective view of the interior of a gear case in the present invention.

Moving forward and backward of an electric car is handled by a gear lever 83 and a clutch by a driver, as shown in FIG. 4, but this is a conventional method, its description is omitted there.

Figure 12:
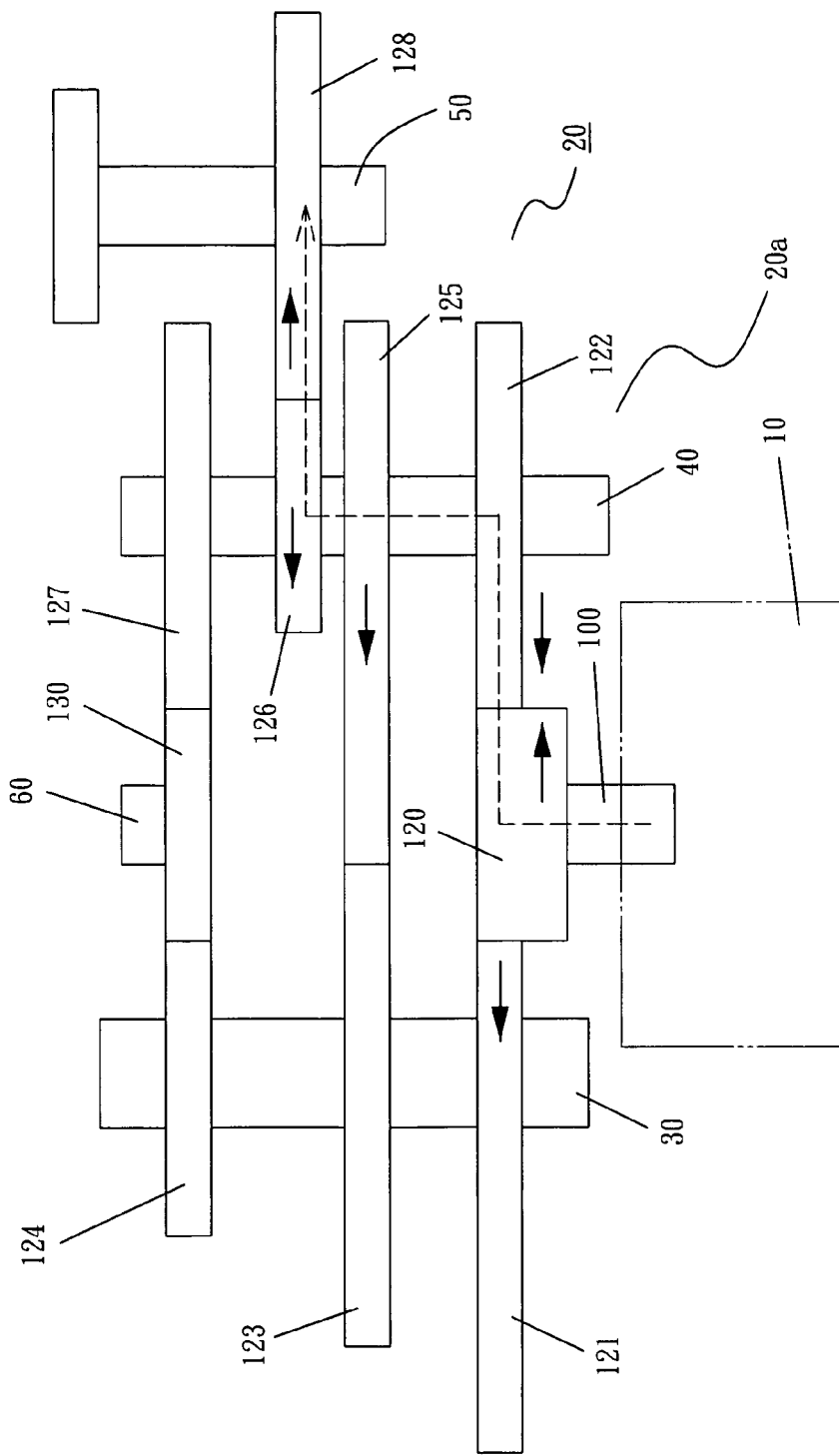
FIG. 12 is a flowing chart of the operation of the transmission system of the electric motor in moving forward at the general common speed in the present invention.

Then the flowing operation of the gear transmission system of the electric motor 10 is described now. In case of getting into the forward running mode, the motor 10 runs at the general common speed transmission route 20a as shown in FIG. 12, its transmitting order starts from the output shaft 100 to the first gear 120, then to the third gear 122 (on the second rotatable shaft 40), then to the seventh gear 126, then to the ninth gear 128. More precisely, the motor 10 moves the first gear 120, which then rotates the third gear 122 and the second rotatable shaft 40 at the same time, and then the second shaft 40 rotates the sixth gear 125 and the seventh gear 126, so the seventh gear 126 rotates the ninth gear 128. Finally the ninth gear 128 drives the driving axle to move the car forward.

Figure 13:
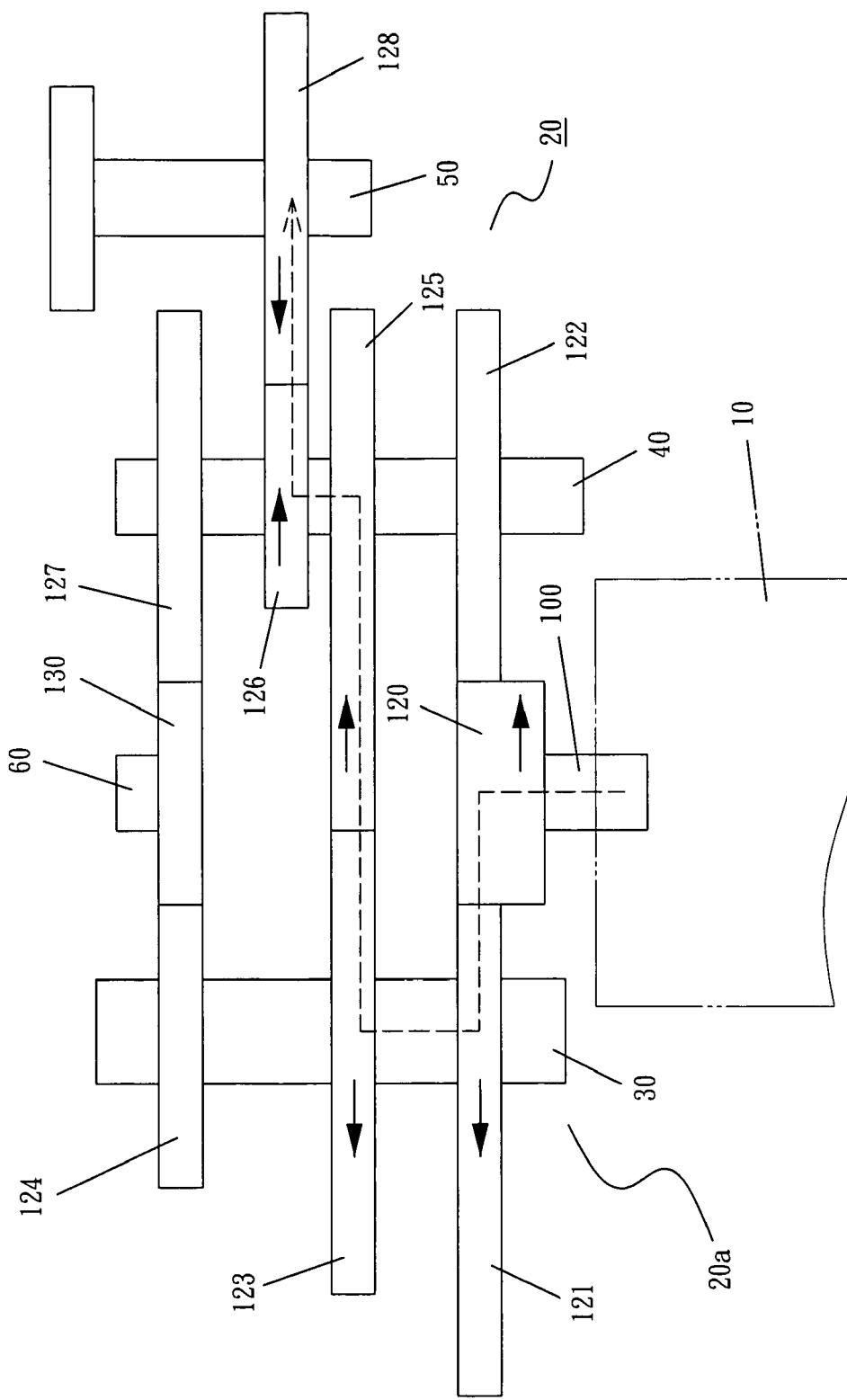
FIG. 13 is a flowing chart of the operation of the transmission system of the electric motor in moving backward at the general common speed in the present invention.

In case of moving back the car, the gear leaver is handled to change to the moving back transmission route. Then the third gear 122 is disengaged from the first gear 120 by means of the clutch, and the transmission system of the motor 10 operates at the general common transmitting speed route 20a as shown in FIG. 13, so the transmitting order starts from the output shaft 100 to the first gear 120, then to the second gear 121 and the first rotatable shaft 30 at the same time, then to the fourth gear 123, then to the sixth gear 125 and the second rotatable shaft 40 at the same time, then to the seventh gear 126, and then to the ninth gear 128. More minutely, the motor 10 rotates the first gear 120, which then rotates the second gear 121, so the first rotatable shaft 30 is rotated to move the fourth gear 123, which then rotates the sixth gear 125, so the sixth gear 125 rotates the second rotatable shaft 40, which then rotates the seventh gear 126 to move the ninth gear 128, so finally the car is driven to move back.

Figure 14:
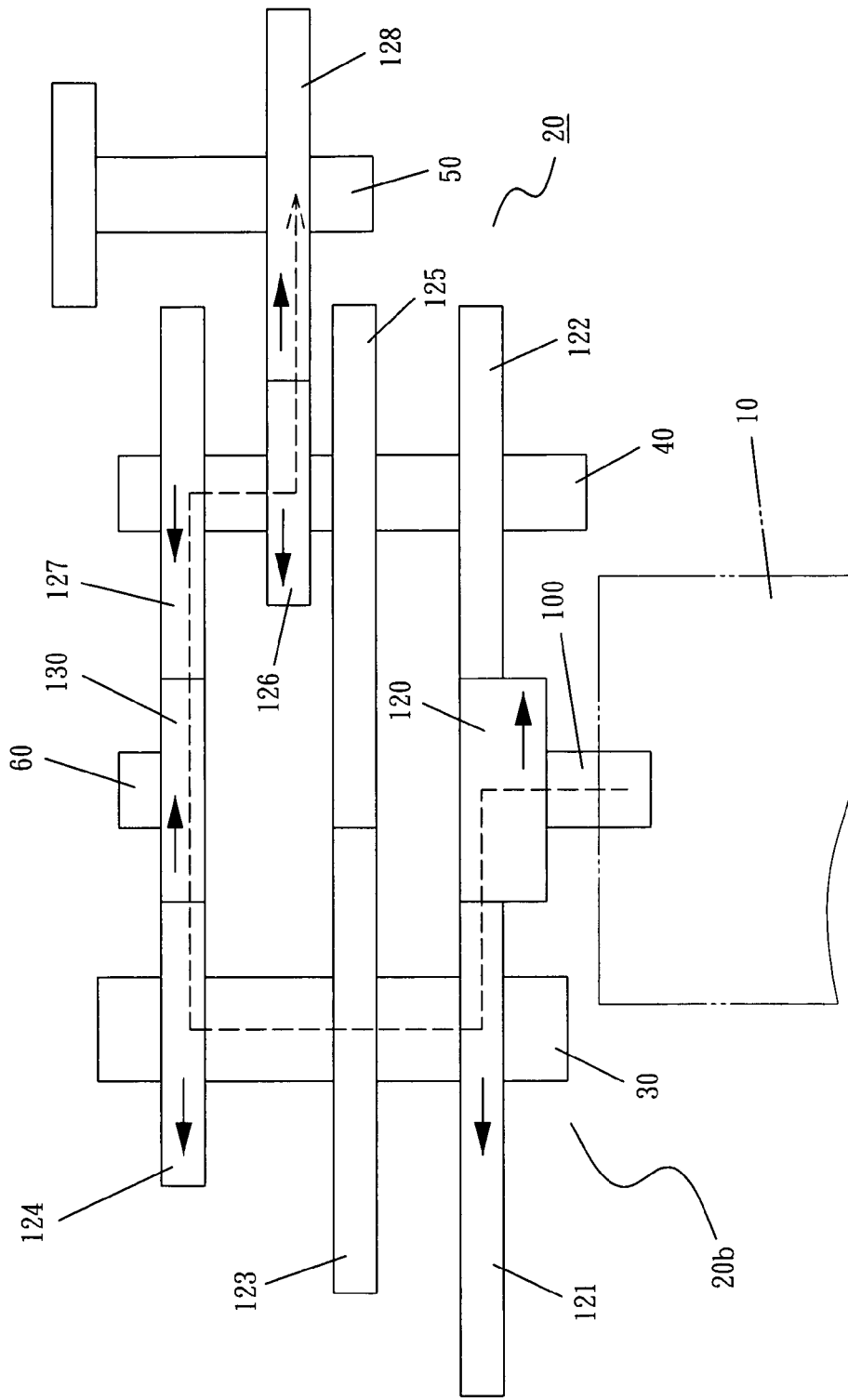
FIG. 14 is a flowing chart of the operation of the transmission system of the electric motor in moving in a lower-speed and power-augmenting transmission route in the present invention.

Next, when an electric car is to move up an upward slope or to have the power increased, the transmission gear system is set at the low-speed and power-augmenting transmitting route 20b as shown in FIG. 14, then the operation order begins from the output shaft 100 to the first gear 120, then to the second gear 121, then to the first rotatable shaft 30, then to the fifth gear 124, then to the guide gear 130, then to the eighth gear 127, then to the second rotatable shaft 40, then to the guide gear 130 to align the rotating direction of the fifth gear 124 to that of the eighth gear 127, so that the second rotatable shaft 40 rotates the seventh gear 126, which then rotates the ninth gear 128. In this way, the electric car does not need to enlarge the power of the electric motor 10, by means of the design of the speed reducing ratio of the first rotatable shaft 30 and all the transmission gears in addition to the rotating-direction reversing method effected by the guide gear 130 and the fifth gear 124 and the eighth gear 127.

Figure 15:
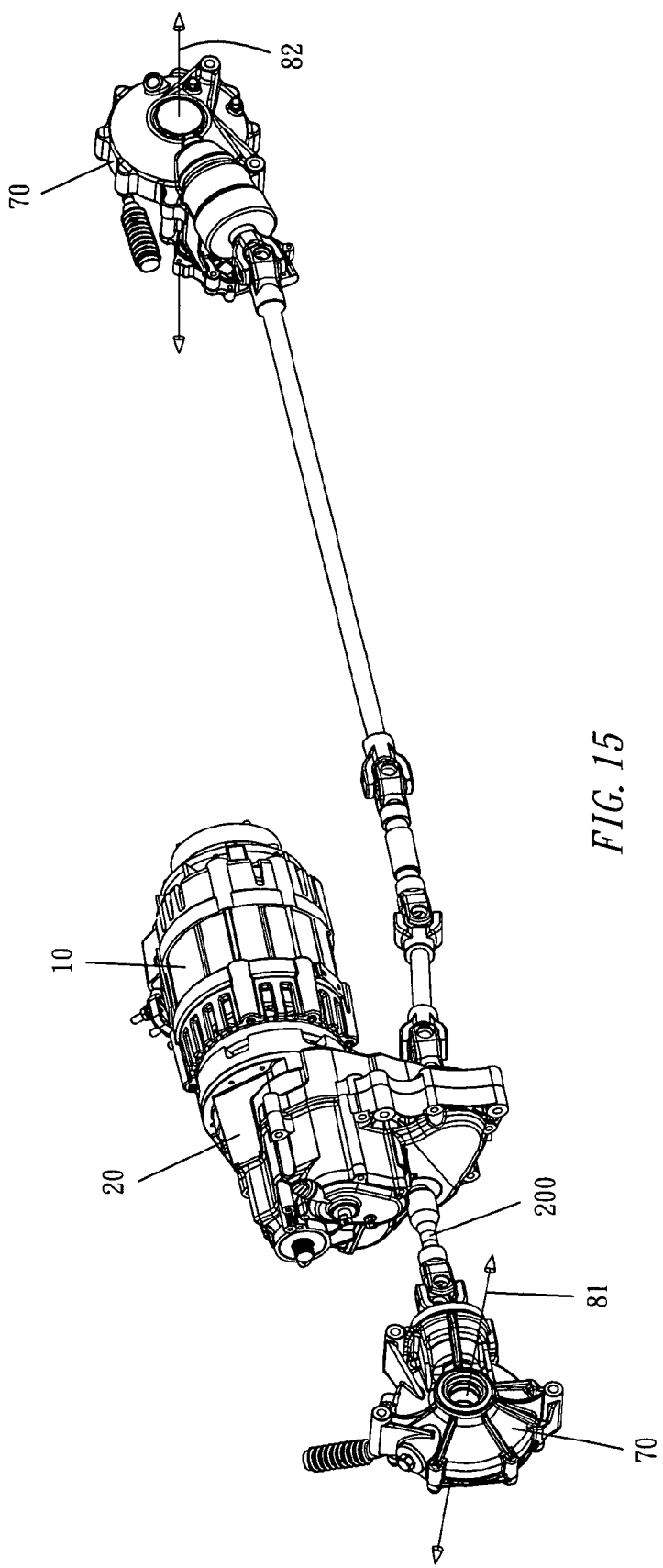
FIG. 15 is a perspective view of the present embodiment with four wheels connected to be driven at the same time in the present invention.

Moreover, if the electric car is needed to have a four wheel driving function, it is only required to install a front wheel driving gear 131 that is made to engage with the ninth gear 128 as shown in FIGS. 8-11, driving the front wheel axle 82 in conjunction of the rear wheel driving function, as shown in FIG. 15.

In this invention, by adding the low-speed and power-augmenting transmitting route 20b to the general common speed gear route 20a having a normal speed reducing ratio for running on common flat roads, the electric motor does not need to be enlarged and can have a large torque to move up easily an upward slope or to cope with a condition needing a large output power, reducing the size, the weight or the cost of the car.

While the preferred embodiment of the invention has been described above, it will be recognized and understood that various modifications may be made therein and the appended claims are intended to cover all such modifications that may fall within the spirit and scope of the invention.

What is claimed is:

1. A power-augmenting transmission structure for an electric car, said structure comprising a gear transmission system consisting of an electric motor, an output shaft provided in said electric motor, a gear case wherein a plurality of transmission gears are installed, said output shaft driving one of said transmission gears optionally, said gear case provided with an output shaft for driving a last one of said transmission gears so that said last gear may drive a driving axle; and wherein said gear case is installed with general common speed transmitting routes with a normal speed reducing ratio and a low-speed and power-augmenting transmitting route, said general common speed transmitting routes used for running on common flat roads, said low-speed and power-augmenting transmitting route used for moving up easily an upward slope or coping with a condition needing a large torque;

wherein said gear case has said general common speed transmitting routes and said low-speed power-augmenting transmitting route, provided with a first transmission gear fixed on an output shaft of an electric motor, a first rotatable shaft fixed thereon with a second transmission gear, a fourth transmission gear with fewer teeth than said second gear, and a fifth gear with fewer teeth than said fourth gear; a second shaft provided with a clutch and fixed thereon with a third transmission gear, a sixth transmission gear, a seventh transmission gear and an eighth transmission gear; said first gear engaging with and rotating said second gear and said third gear, said fourth gear and said sixth gear able to engage with or disengage from each other by means of said clutch; a third rotatable shaft having a ninth transmission gear fixed thereon, said ninth gear engaging with said seventh gear so that said third rotatable shaft may transmit power; a fourth rotatable shaft having a guide gear fixed thereon, said guide gear located between said fifth gear and said eighth gear and engaging with said fifth gear and said eighth gear; said electric car increasing its power at a low speed by means of said first rotatable shaft together with all said transmission gears with the set speed reducing ratio in addition to said guide gear capable to let said fifth gear and said eighth gear rotate in a same direction.

2. The power-augmenting gear structure for an electric car as claimed in claim 1, wherein said ninth gear engages with a set of front wheel driving gears extra added, making said electric car provided with four wheel driving function.

* * * * *